US007680017B2

(12) United States Patent
Binnig et al.

(10) Patent No.: US 7,680,017 B2
(45) Date of Patent: Mar. 16, 2010

(54) DATA READ/WRITE SYSTEMS COMPRISING A TIP

(75) Inventors: Gerd K. Binnig, Wollerau (CH); Walter Haeberle, Wadenswil (CH); Peter Vettiger, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 12/131,231

(22) Filed: Jun. 2, 2008

(65) Prior Publication Data

US 2008/0225679 A1 Sep. 18, 2008

Related U.S. Application Data

(63) Continuation of application No. 10/472,021, filed as application No. PCT/IB02/00816 on Mar. 15, 2002, now Pat. No. 7,394,749.

(30) Foreign Application Priority Data

Mar. 23, 2001 (EP) .................................. 01810296

(51) Int. Cl.
*G11B 7/00* (2006.01)

(52) U.S. Cl. ........................................................ 369/126

(58) Field of Classification Search ....................... None
See application file for complete search history.

(56) References Cited

U.S. PATENT DOCUMENTS 5,751,683 A 5/1998 Kley
5,986,984 A 11/1999 Nakamura et al.
6,084,849 A 7/2000 Durig et al.

*Primary Examiner*—Joseph H Feild
*Assistant Examiner*—Joseph Haley
(74) *Attorney, Agent, or Firm*—F. Chau & Associates, LLC

(57) ABSTRACT

A method for writing data to and/or reading data from locations on a surface via a tip comprises moving the tip between the locations on the surface. At each location, energy is selectively applied to the surface via the tip and the tip and the surface are selectively forced together in synchronization with the application of energy.

2 Claims, 7 Drawing Sheets

15
30
$E_W$
40
90
120
$F_W$

DATA READ/WRITE SYSTEMS COMPRISING A TIP

CROSS-REFERENCE TO RELATED APPLICATION

This is a Continuation application of U.S. application Ser. No. 10/472,021 filed on Mar. 1, 2004, now U.S. Pat. No. 7,394,749, which is a national stage application claiming the benefit of International Application PCT/IB02/00816 filed Mar. 15, 2002, which claims the benefit of application number 01810296.2 filed with the European Patent Office (EPO) on Mar. 23, 2001, the disclosures of which are herein incorporated by reference in their entirety.

BACKGROUND

1. Technical Field

The present invention generally relates to a method and apparatus for writing data to and/or reading data from a storage surface via a tip.

2. Discussion of Related Art

An example of a such a storage device is described in "The "Millipede"—More than one thousand tips for future AFM data storage", P. Vettiger et al., IBM Journal of Research and Development. Vol. 44 No. 3, May 2000. As described therein, this device comprises a two dimensional array of cantilever sensors fabricated on a silicon substrate. Each cantilever is attached at one end to the substrate. The other end of each cantilever carries a resistive heater element and an outward facing tip. Each cantilever is addressable via row and column conductors. The row and column conductors permit selective passage of electrical current through each cantilever to heat the heating element thereon.

In both reading and writing operations, the tips of the array are brought into contact with and moved relative to a storage medium comprising a polymer layer such as a layer of polymethylmethacrylate (PMMA) coating a plane substrate.

Data is written to the storage medium by a combination of applying a local force to the polymer layer via each tip and selectively heating each tip via application of data signals through the corresponding row and column conductors to a level sufficient to locally deform the polymer layer, thereby causing the tip to leave an indentation or pit in the surface of polymer layer. Conventionally, the local force is applied by mechanically biassing the tip against the polymer layer. The storage medium can be thermally erased and then rewritten multiple times. To erase the storage medium, the polymer layer is heated to a level sufficient reflow the polymer layer thereby removing all indentations recorded in the storage medium.

Each heating element also provides a thermal read back sensor because it has a resistance which is dependent on temperature. For data reading operations, a heating signal is applied sequentially to each row in the array. The heating signal heats heating elements in the selected row, but now to a temperature which is insufficient to deform the polymer layer. The thermal conductance between the heating elements and the storage medium varies according to distance between the heating elements and the storage medium. When the tips move into bit indentations as the array is scanned across the storage medium, the distances between the heating elements and the storage medium reduce. The medium between the heating elements and the storage medium transfers heat between the heating elements and the storage medium. Heat transfer between each heating element and the storage medium becomes more efficient when the associated tip moves in an indentation. The temperature and therefore the resistance of the heating element therefore reduces. Changes in temperature of the continuously heated heating elements of each row can be monitored in parallel, thereby facilitating detection of recorded bits. Conventionally, relatively long tips have been employed in the interests of achieving acceptable signal to noise ratios. However, such long tips are relatively delicate and difficult to manufacture. Also, in conventional devices, relatively soft polymers are employed in the interests of ease of writing. However, a problem associated with such materials in that deformations therein are relatively sensitive to temperature changes. Specifically, the deformations can be removed by changes in environmental temperature, resulting in a corresponding loss of data. Additionally, as the array is scanned across the surface, the tips wear against the polymer material.

BRIEF SUMMARY

In accordance with the present invention, there is now provided a method for writing data to and/or reading data from locations on a surface via a tip, the method comprising: moving the tip between the locations on the surface; and, at each location, selectively applying energy to the surface via the tip and selectively forcing the tip and the surface together in synchronization with the selective application of energy. This arrangement improves reading and writing sensitivity.

The tip is preferably moved alternately towards and away from the surface. This reduced wear on the tip as the tip is moved between locations.

Further enhancements to reading and writing operations are achieved in preferred embodiments of the present invention by selectively forcing the tip and the surface together coincidentally with the selective application of energy to the surface via the tip.

Additional enhancements to reading and writing operations are achieved in particularly preferred embodiments of the present invention by offsetting the selective applying of energy to the surface relative to the selective forcing of the tip and surface together.

In preferred embodiments of the present invention, improved writing performance is achieved by the selective applying of energy to the surface comprising applying energy to the surface via the tip as the tip and the surface are moved towards each other. In particularly preferred embodiments of the present invention, further improvement in writing performance is achieved by the selective applying of energy to the surface comprising applying energy to the surface via the tip coincidentally with the tip engaging the surface.

Similarly, in preferred embodiments of the present invention, improved reading performance is achieved by the selective applying of energy to the surface comprising applying energy to the surface via the tip as the tip and the surface are moved away from each other. In particularly preferred embodiments of the present invention, further improvement in reading performance is obtained by the selective applying of energy to the surface comprising applying energy to the surface via the tip coincidentally with the tip disengaging the surface.

In especially preferred embodiments of the present invention, the selective forcing of the tip and the surface together comprises selectively generating a force field acting on the tip to urge the tip and the surface together. Preferably, the tip is moved into and out of contact with the surface by the selective generation of the force field. The force field may comprise an electric field. Alternatively, the force field may comprise a magnetic field. In especially preferred embodiments of the present invention, the energy comprises heat energy.

Viewing the present invention from another aspect, there is now provided apparatus for writing data to and/or reading data from locations on a surface via a tip, the apparatus comprising: a first transducer subsystem for moving the tip between the locations on the surface; a second transducer subsystem for selectively applying energy to the surface via the tip at each location; and, a third transducer subsystem for selectively forcing the tip and the surface together in synchronization with the application of energy by the second transducer subsystem.

The third transducer subsystem preferably moves the tip alternately towards and away from the surface in synchronization with the application of energy by the second transducer subsystem. In preferred embodiments of the present invention, the third transducer subsystem selectively forces the tip and the surface together coincidentally with the application of energy by the second transducer subsystem.

In particularly preferred embodiments of the present invention, the application of energy to the surface by the second transducer subsystem is offset relative to the selective forcing of the tip and surface together by the third transducer subsystem. In such embodiments, the second transducer subsystem preferably applies energy to the surface via the tip as the tip and the surface are moved towards each other by the third transducer subsystem during writing operations. The second transducer subsystem may, during writing operations, apply energy to the surface to the surface via the tip coincidentally with the tip being brought into contact with the surface by the third transducer subsystem. During reading operations, the second transducer subsystem preferably applies energy to the surface via the tip as the tip and the surface are moved away from each other by the third transducer subsystem. The second transducer subsystem may, during reading operations, apply energy to the surface via the tip coincidentally with the tip being moved out of contact with the surface by the third transducer subsystem.

In particularly preferred embodiments of the present invention, the third transducer subsystem comprises a force field generator for selectively generating a force field acting on the tip to urge the tip and the surface together. The force field generator preferably moves the tip into and out of contact with the surface by the selective generation of the force field. The force field generator may comprise an electric field generator. Alternatively, the force field generator may comprise a magnetic field generator.

The second transducer system preferably comprises a heater for applying energy to the surface in the form of heat.

The present invention also extends to a data storage device comprising a storage surface, a tip facing the storage surface, and apparatus for writing data to and/or reading data from locations on the surface via the tip as hereinbefore described. The preset invention further extends to a data processing system comprising a central processing unit and such a data storage device connected to the central processing unit.

BRIEF DESCRIPTION OF THE SEVERAL VIEWS OF THE DRAWINGS

Preferred embodiments of the present invention will now be described, by way of example only, with reference to the accompanying drawings, in which.

DETAILED DESCRIPTION

Figure 1:
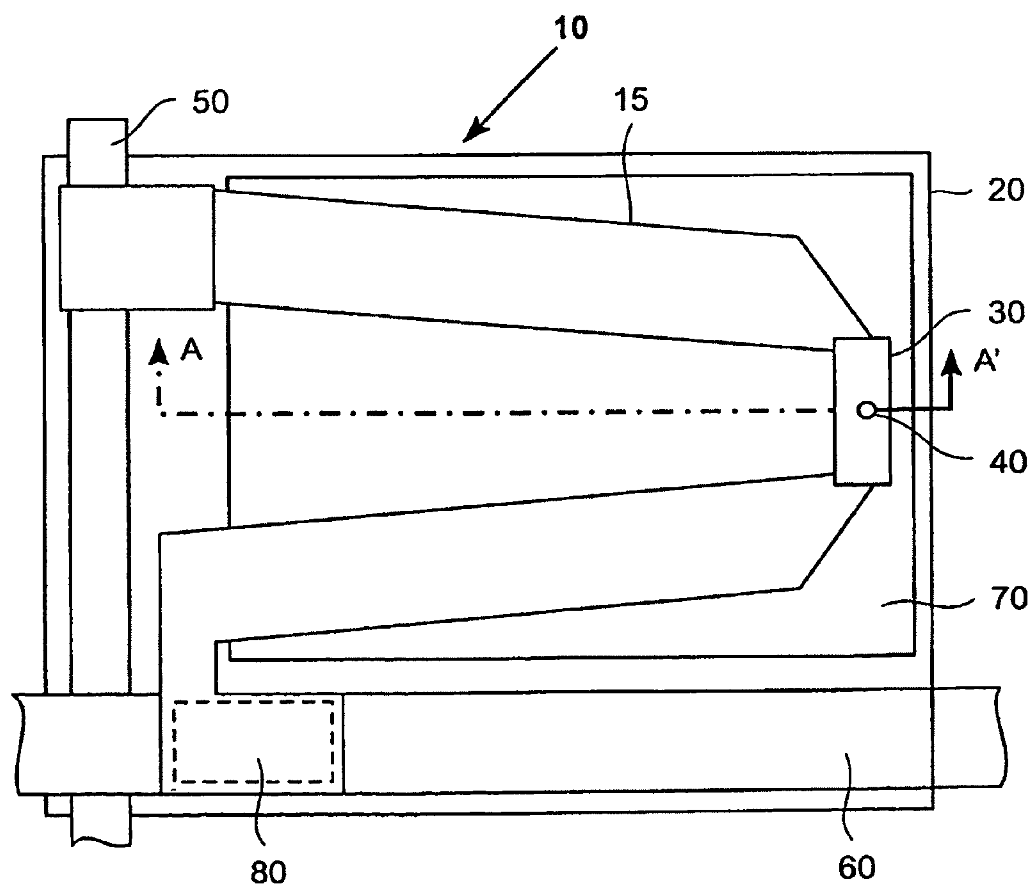
FIG. 1 is a plan view of a sensor of a data storage device embodying the present invention.

Referring first to FIG. 1, an example of a data storage system embodying the present invention comprises a two dimensional array of cantilever sensors 10 disposed on a substrate 20. Row conductors 60 and column conductors 50 are also disposed on the substrate. Each sensor 10 is addressed by a different combination of a row conductor 60 and a column conductor 50. Each sensor 10 comprises a U-shaped silicon cantilever 15 of a length in the region of 70 um and thickness in the region of micro meters. Limbs of the cantilever 15 are fixed, at their distal ends, to a silicon substrate 20. The apex of the cantilever 15 resides in a recess 70 formed in the substrate 20 and has freedom for movement in a direction normal to the substrate 20. The cantilever 15 carries, at its apex, a resistive heater element 30 and a silicon tip 40 facing away from the substrate 20. The limbs of the cantilever 15 are highly doped to improve electrical conductance. The heater element 30 is formed by doping the apex of the cantilever 15 to a lesser extent, thereby introducing a region of increased electrical resistance to current flow through the cantilever 15. One of the limbs of the cantilever 15 is connected to a row conductor 60 via an intermediate diode 80. The other limb of the cantilever 15 is connected to a column conductor 50. Row conductor 60, column conductor 70, and diode 80 are also disposed on the substrate 20.

Figure 2:
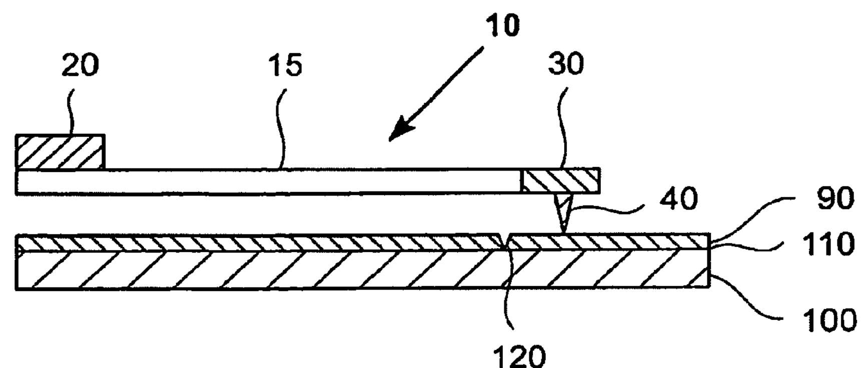
FIG. 2 is a cross-sectional view of the sensor when viewed in the direction of arrows A-A'.

Referring now to FIG. 2, the tip 40 is urged against a planar storage medium in the form of a polymer layer 90 such as a film of polymethylmethacrylate (PMMA) of a thickness in the region of 40 nm. The polymer layer 90 is carried by a silicon substrate 100. An optional buffer layer 110 of cross-linked photo-resist such as SU-8 of a thickness in the region of 70 nm is disposed between the polymer layer 90 and the substrate 100. In both reading and writing operations, the tip 40 of the array is moved across the surface of the storage medium. In writing operations, the array of tips can be moved relative to the storage medium to enable writing of data over an area of the polymer layer 90.

Data is written to the storage medium by a combination of applying a local force to the polymer layer 90 via the tip and applying energy to the surface in the form of heat via the tip 40 by passing a write current through the cantilever 15 from the corresponding row conductor 60 to the corresponding column conductor 50. Passage of current through the cantilever 15 causes the heater element 30 to heat up. Heat energy is passed from the heater element 30 into the tip 40 via thermal conductance.

Figure 3:
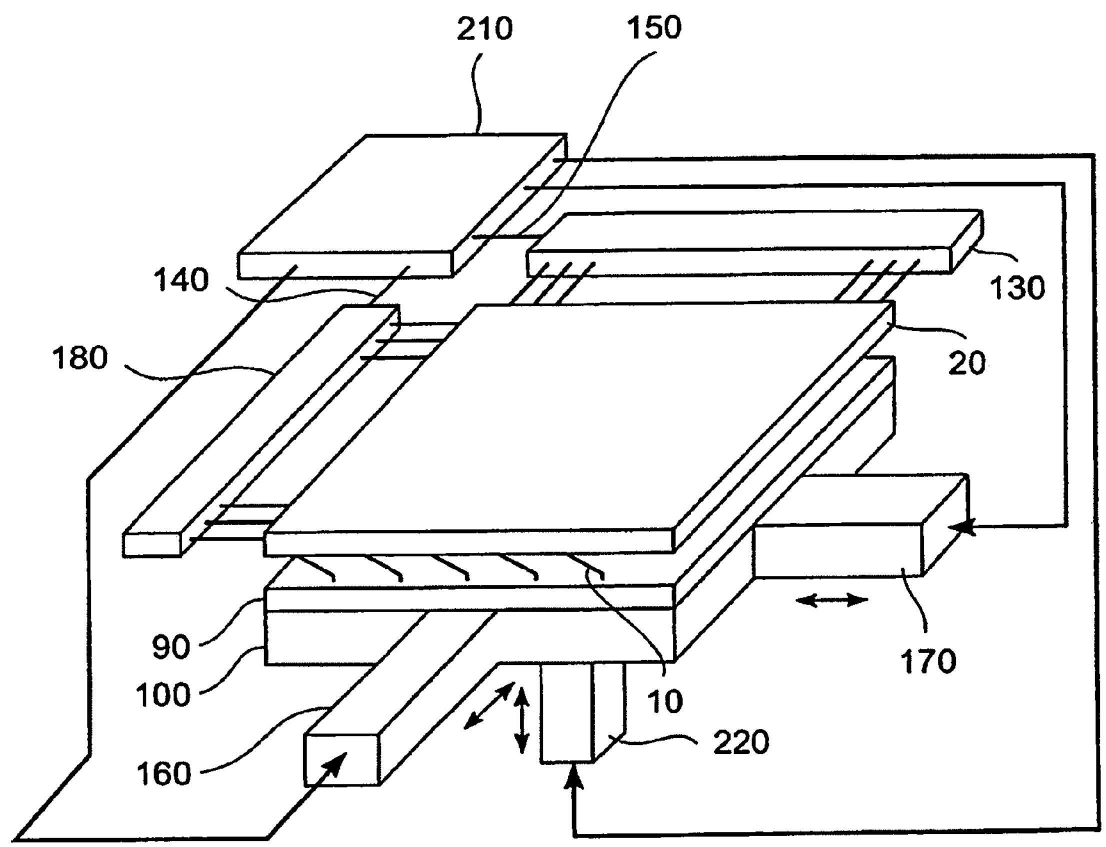
FIG. 3 is an isometric view of the data storage device.

With reference to FIG. 3, each of the row conductors 60 is connected to a separate line of row multiplexer 180. Similarly, each of the column conductors 50 is connected to a separate line of a column multiplexer 130. Data and control signals are communicated between a controller 210 and the row and column multiplexers 180 and 130 via control lines 140 and 150 respectively. The storage medium 90 can be moved in a controlled manner relative to the array in orthogonal directions via positioning transducers 160, 170, and 220. Transducers 160 and 170 effect movement of the array in a plane parallel to the surface of the polymer layer 90. Transducer 220 effects movement of the array in a direction perpendicular to the array. In operation, the controller 210 generates write signals for driving the array during writing operations, read signals for driving the array during read operations, and positioning signals for driving the transducers 160, 170, and 220 to control movement of the tips in the array relative to the surface of the polymer layer 90. The controller 210 also receives outputs from the array during read operations. In particularly preferred embodiments of the present invention, transducers 160, 170, and 220 are implemented by piezoelectric transducers, electromagnetic transducers, or a combination thereof. However, it will be appreciated that other implementations are possible. The controller 210 may be at least partially implemented by a microprocessor, micro-controller or similar control device or collection of control devices. In some embodiments of the present invention, the transducer 220 may be omitted.

Figure 4:
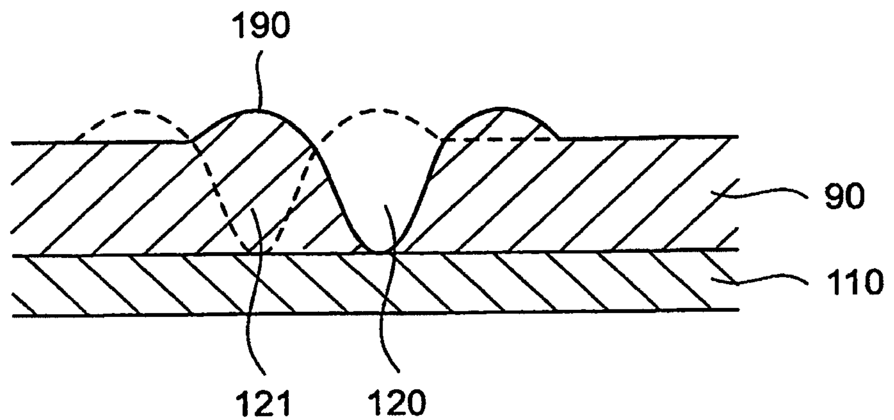
FIG. 4 is a cross-sectional view of a storage medium of the data storage system after a write operation.

With reference to FIG. 4, the write current is selected to heat the tip 40 to a level sufficient to locally deform the polymer layer 90, thereby causing the tip 40 to indent the surface of the polymer layer 90 and leave a pit 120 of a diameter in the region of 40 nm. By way of example, it has been found that local deforming of a PMMA film can be achieved by heating the tip 40 to a temperature of the order of 700 degrees centigrade. The optional buffer layer 110 has a higher melting point than the PMMA film 90 and therefore acts as a penetration stop to prevent abrading of the tip 40 against the substrate 110. The pit 120 is surrounded by a ring 190 of polymer material raised above the polymer layer 90. A second, overlapping pit 121 is shown in phantom dotted lines.

The heating element 30 also provides a thermal read back sensor because it has a resistance which is dependent on temperature. For data reading operations, a heating current is passed though the cantilever 15 from the corresponding row conductor 60 to the corresponding column conductor 50. Accordingly, the heating element 40 is again heated, but now to a temperature which is insufficient to deform the polymer layer 90. Reading temperatures of the order of 400 degrees centigrade are, for example, insufficient to melt a PMMA film, but nevertheless provide acceptable reading performance. The thermal conductance between the heating element 30 and the polymer layer 90 varies according to distance between the heating element and the polymer layer 90. During a reading operation, the tip 40 of is scanned across the surface of the polymer film 90. This is achieved by moving the array relative to the polymer film 90. When the tip 40 moves into a pit 12Q, the distances between the heating element 30 and the polymer layer 90 reduce. The medium between the heating element 30 and the polymer layer 90 transfers heat between the heating element 40 and the polymer layer 90. Heat transfer between the heating element 30 and the polymer layer 90 more efficient when the tip 40 moves in the indentation 120. The temperature and therefore the resistance of the heating element 30 therefore reduces. Changes in temperature of the heated heating element 30 row can be monitored in parallel, thereby facilitating detection of recorded bits.

The aforementioned heating current is produced by applying a heating voltage pulse to the corresponding row conductor 60. Accordingly, a heating current flows through each sensor 10 connected to the row conductor 60 to which the heating voltage pulse is applied. All the heating elements 30 in the corresponding row of the array are therefore heated. Recorded data is then read out from in parallel from the heated row of sensors 10. Each row of the array is thus read sequentially according to a multiplexing scheme. In a preferred embodiment of the present invention, the storage medium provides a 3 mm.times.3 mm storage surface.

Figure 5:
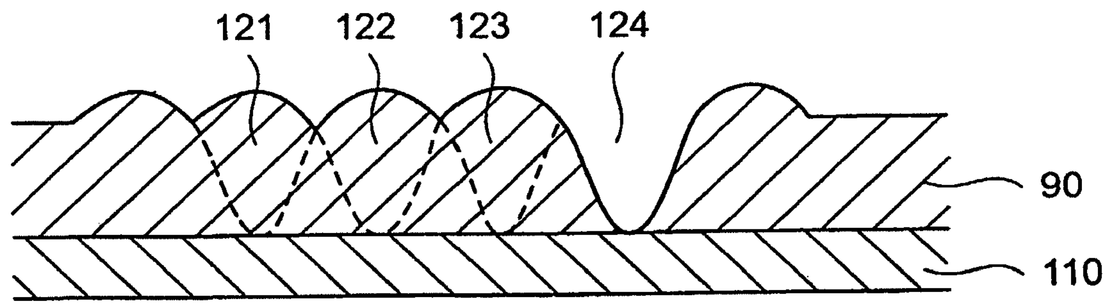
FIG. 5 is a cross-sectional view of the storage medium after a selective erase operation.
Figure 6:
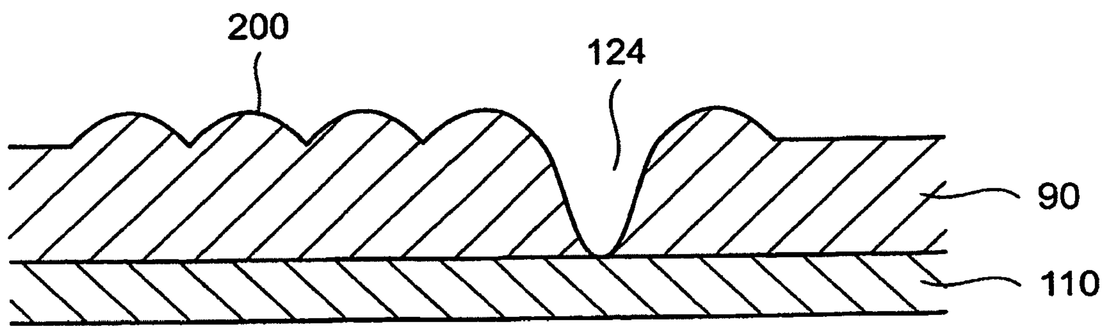
FIG. 6 is another cross-sectional view of the storage medium after a selective erase operation.

Turning now to FIG. 5, recorded data bits can be selectively erased by forming new pits 121-124 overlapping each other over prerecorded data to be erased to substantially level the surface of the polymer layer 90. This is achieved by performing the aforementioned write operation to overwrite pits to be erased with a greater density of new pits 121-124 overlapping each other so that each new pit effectively erases the immediately preceding pit. Referring to FIG. 6, the overlapping new pits 121-124 merge with each other and the pit to be erased 120 to substantially level the surface of the polymer layer 90. As mentioned earlier, the erasure need not be total. A series of ripples 200 may be left in the surface of the polymer layer 90. It is sufficient that an erased bit is not detected as a data bit during a read operation. This will of course depend on data reading sensitivity. The controller 210 is operable in an erase mode to control formation of the new pits 121-124. Returning to FIG. 5, it may be acceptable in some applications for the last new bit in a sequence written to erase an unwanted data sequence, such as the bit represented by new pit 124 for example, to form part of a new data sequence to be recorded. In other arrangement, the density at which new bits are written to erase unwanted bits may be such that no new bits remain recorded in the surface.

Figure 7:
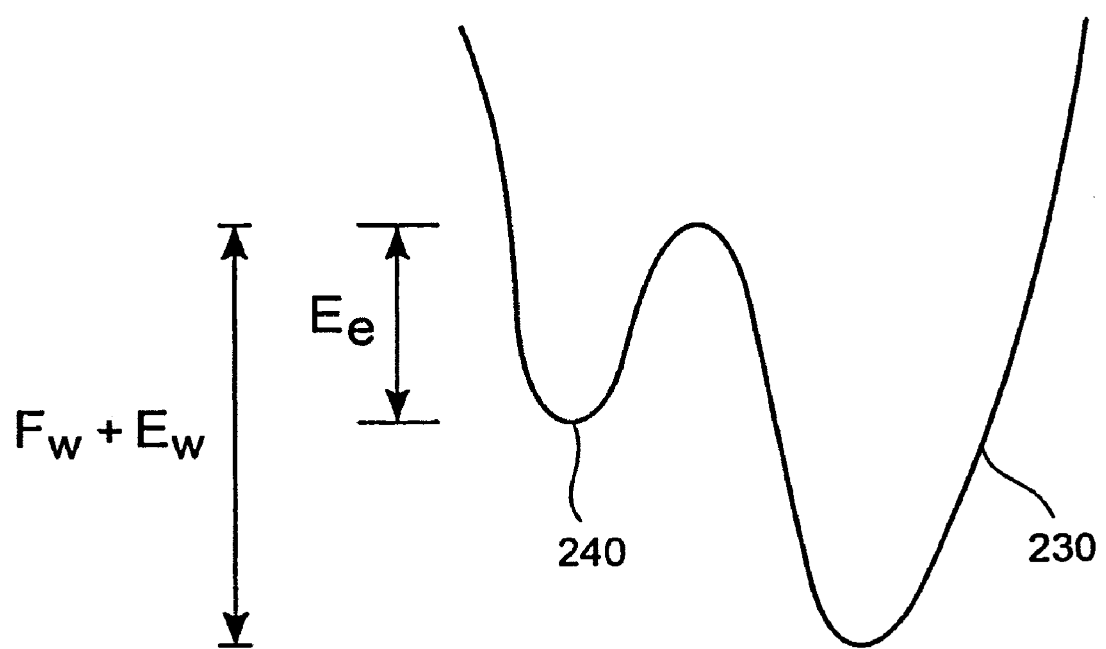
FIG. 7 is an energy diagram of the surface of the storage medium.
Figure 8:
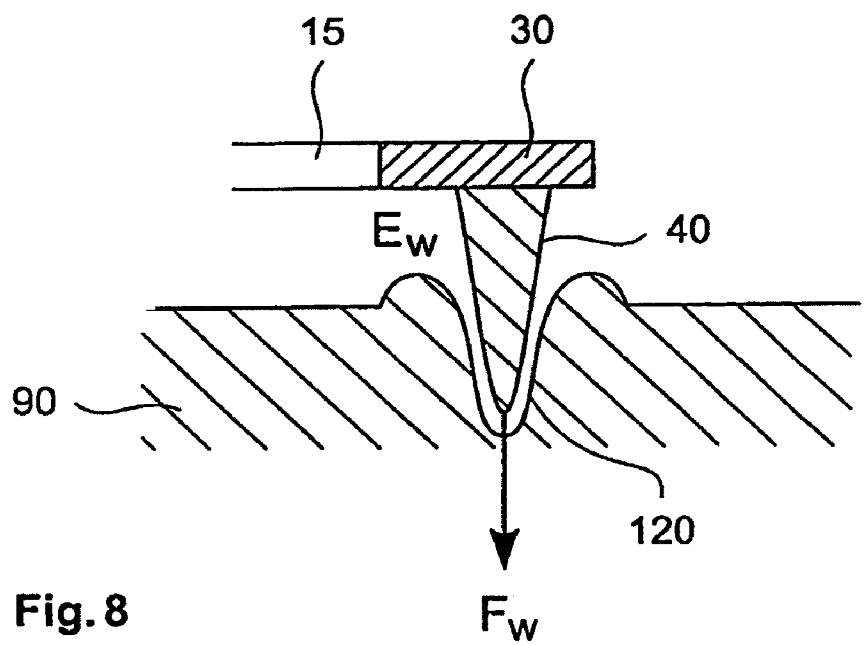
FIG. 8 is a cross-sectional view of the storage medium during a write operation.
Figure 9:
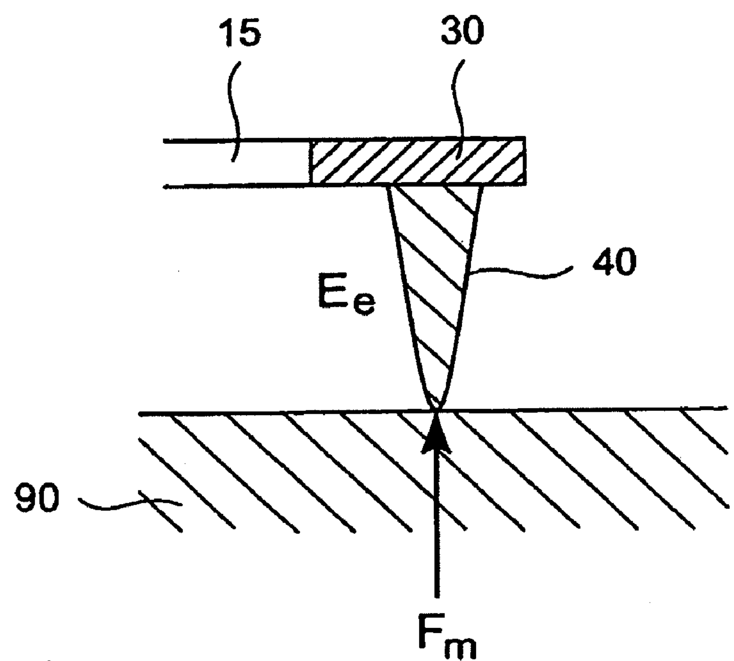
FIG. 9 is a cross-sectional view of the storage medium during a selective erase operation.

Referring to FIG. 7, the surface of the polymer layer 90 has a stable or ground state 230 and a metastable state 240. Applying a combination of force $F_w$ and energy $E_w$ to the surface via the tip 40 deforms the surface into its metastable state 240 at the point of contact with the tip 40. With reference now to FIGS. 7 and 8 in combination, in a preferred embodiment of the present invention, a data bit written at a location on the surface by positioning the tip 40 at the location and applying a combination of force $F_w$ and energy $E_w$ to the surface via the tip 40 to deform the surface at the location. Referring to FIG. 9, the data bit is then erased by positioning the tip 40 in deformation and applying energy $E_e$ to the surface via the tip 40. Energy $E_e$ may be less than that required to write a data bit onto the surface but greater than that required to read a data bit recorded in the surface. Alternatively, energy $E_e$ may be similar in magnitude to energy $E_w$. Either way, energy $E_e$ is sufficient to relax the surface from the metastable stable 240 to the stable state 230. In the erase operation, force $F_w$ is reduced and may be removed altogether. The relief of force $F_w$ may be implemented via the transducer 220. With the force $F_w$ relieved, and energy $E_e$ applied to excite molecules in the deformed surface, intermolecular forces $F_m$ in the surface are sufficient to push the tip 40 out as the surface relaxes into its stable state. As indicated earlier, the different combinations of energy and force required for reading, writing, and selective erasing operations are provided to the array by the controller 210.

Figure 10:
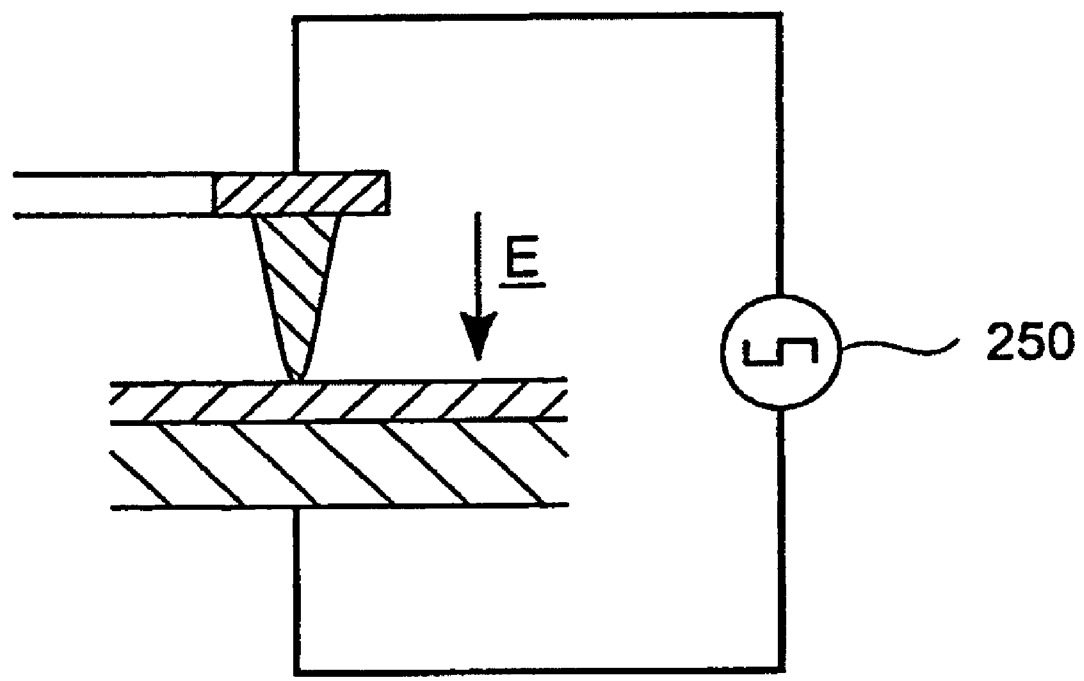
FIG. 10 is another cross-sectional view of a sensor of the data storage device.

With reference to FIG. 10, in a preferred embodiment of the present invention, the substrate 110 is conductive and the controller 210 comprises a voltage signal generator 250 which is selectively connectable to each of the tips 40 of the array for selectively establishing a potential difference between each tip 40 and the adjacent region of the storage medium. The potential difference produces an electric field E in the region of each tip 40. The electric field E is oriented to urge the tip 40 towards the surface of the polymer layer 90. The tip 40 thus applies an additional force to the surface of the polymer layer 90 under the influence of the electric field E. The additional force can be employed to enhance both reading and, in particular, writing operations. Specifically, the additional forces permits higher data rates to be achieved in both reading and writing operations. Experiments indicate that, in the nano-meter range, viscous counter forces act against deformation of the surface of the polymer layer 90 by the tip 40 at speeds greater than around 5 microseconds. The additional force imposed by the electric field E assists in overcoming such viscous forces. The effect of the E field is further enhanced by reducing the size of the tip 40. Experiments indicate that a considerable force can be locally imposed on the surface of polymer layer 90 when the tip 40 is made considerably shorter than 1 micrometer. For such short tips, the capacitance between the sensor 10 and the substrate 100 is relatively high. For example, experiments indicate that a voltage of 10V imposed between the substrate 100 and a tip 40 of length 100 nm imposes a force on the polymer layer 90 of around 0.1 mN. This force is strong enough to produce indentations in relatively soft polymers even when the tip 40 and the polymer layer 90 are at room temperature. In the absence of the electric field, the tip imposes a loading of around 0.0001 mN. Heating the tip 40 greatly reduces the penetration time in the presence of the electric field E. Specifically, experiment indicates that the additional force provided by the E field brings the data rate during writing operations into the nanosecond regime. Also, the combination of heating the tip 40 and applying the electric field E increases flexibility in performing selective bit erasing or overwriting operations. To write a bit and simultaneously erase neighboring bits, it is desirable to maintain the temperature of the tip 40 at a relatively high level. However, to write a bit and avoid simultaneously erasing neighboring bits, it is desirable to maintain the force applied to the polymer layer 90 via the tip 40 at a relatively high level. Experiments indicate that a combination of the force imposed by the aforementioned electric field E and the heating of the tip 40 may lead to an increase in data storage density of a factor of 4.

Figure 11A:
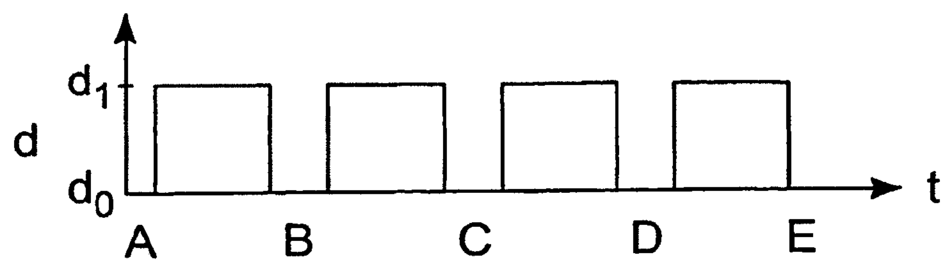
FIG. 11A is a graph of spacing between the sensor and the storage medium as the sensor is addressed to successive locations on the storage surface.

With reference now to FIG. 11A, in a particularly preferred embodiment of the present invention, the tips 40 are lifted off the surface of the of the polymer layer 90 between both successive reading operations and successive writing operations. By way of example, FIG. 11A demonstrates the variation in spacing d between a tip 40 and the surface of the polymer layer 90 as the tip 40 is sequentially moved through successive positions A to E on the polymer layer 90. $d_0$ indicates the spacing when the tip 40 is in contact with the surface. Positions A to E may be equidistantly or unequally spaced on the surface according to Thus, $d_0=0$. $d_1$ indicates the spacing when the tip 40 is furthest removed from the surface. The spacing d is controlled by the controller 210 via the transducer 220.

Figure 11B:
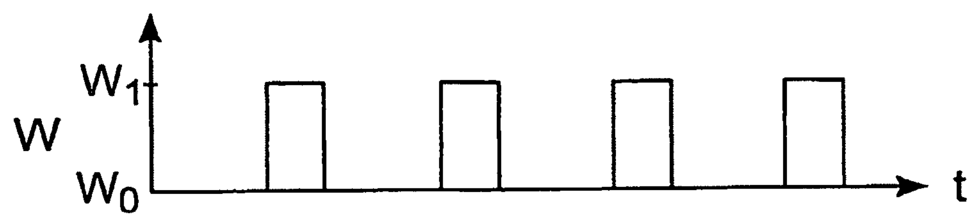
FIG. 11B is a graph of write signals applied to the sensor at each of the successive locations.

Referring to FIG. 11B, in a write operation for writing data bits at positions A to E, the controller 210 applies a write voltage pulse $W_1$ across the heating element corresponding to the tip 40 as the tip 40 impacts the polymer layer 90. The write voltage pulse $W_1$ produces a current flow in the heating element 30 of sufficient magnitude to generate enough energy at the tip 40 to locally deform the surface of the polymer layer 90 in the region of the tip 40. Enhanced deformation of the surface of the polymer layer 90 is achieved via the tip 40 impacting the surface from a remote position because additional energy is thereby imparted to the surface of the polymer layer 90. The enhanced deformation improves the definition of the recorded data. As the sequence of positions A to E are written to sequentially, the corresponding successive write pulses form a write signal W alternating between an upper voltage level $W_1$ and a lower voltage level $W_0$. In some embodiments of the present invention, the write pulses $W_1$ may be coincident with the period for which the tip 40 is in contact with the surface of the polymer layer 90. However, in particularly preferred embodiments of the present invention, the write pulse $W_1$ is skewed relative to the period of contact between tip 40 and the polymer layer 90 such that the write voltage is applied across the heating element 30 prior to the time of impact of the tip 40 on the surface of the polymer layer 40; continues to be applied into the period for which the tip 40 is in contact with the polymer layer 90; and, is removed prior to disengagement of the tip 40 from the polymer material 90. The skewing of the write pulse relative to the contact period optimizes energy transfer from the tip 40 to the surface of the polymer layer 90, thereby enhancing the extent of deformation of the surface of polymer surface.

Figure 11C:
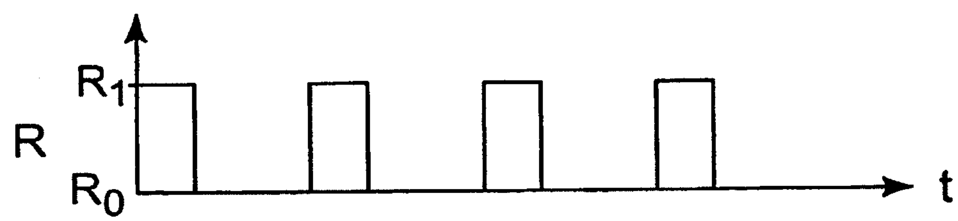
FIG. 11C is a graph of read signals applied to the sensor at each of the successive location; and, FIG. 11D is a graph of a time varying electric field applied to the sensor at each of the successive locations.

Referring to FIG. 11C, in a read operation for reading data bits at positions A to E, the controller 210 applies a read voltage pulse $R_1$ across the heating element corresponding to the tip 40 as the tip 40 is removed from the polymer layer 90. The read voltage pulse $R_1$ produces a current flow in the heating element 30 of sufficient magnitude to generate enough energy in the region of the tip 40 to permit detection of variations in energy transfer corresponding to deformations in the surface of the polymer layer 90. Detection of recorded data is enhanced by the forces at the surface of the polymer layer 90 acting in opposition to the disengagement of the tip 40 from the polymer layer 90. As the sequence of positions A to E are read sequentially, the corresponding successive read pulses form a read signal W alternating between an upper voltage level $R_1$ and a lower voltage level $R_0$. In some embodiments of the present invention, the read pulses $R_1$ may be coincident with the period for which the tip 40 is in contact with the surface of the polymer layer 90. However, in particularly preferred embodiments of the present invention, the read pulse $R_1$ is skewed relative to the period of contact between tip 40 and the polymer layer 90 such that the read voltage is applied across the heating element 30 during the period for which the tip 40 is in contact on the surface of the polymer layer 40 and is removed after the tip 40 is disengaged from the polymer layer 90 but prior to the next contact between tip 40 and the polymer material 90. The skewing of the read pulse relative to the contact period optimizes detection of data bits recorded in the deformations of the surface of the polymer material 90.

It will be appreciated, that during the reading and writing operation hereinbefore described with reference to FIGS. 11A to 11C, the tips 40 of the array remain in contact with polymer layer 90 for only a relatively short period of time (typically in the range of milli- to microseconds). This advantageously reduces frictional impediments to the lateral movement of the tips 40 relative to the polymer layer 100. In addition, this limits wear to the tips 40 otherwise produced by prolonged contact between the tips 40 and the polymer layer 90. Also, this reduces demand for uniformity and accuracy in the size of the tips 40. A greater variation in spacing of the tips 40 and the polymer layer 100 can be tolerated. This reduces manufacturing costs and improves process yields.

Figure 11D:
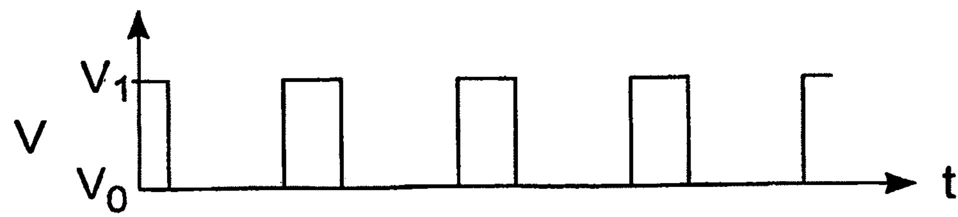

With reference to FIG. 11D, in an especially preferred embodiment of the present invention, both reading and writing operations are enhanced by varying the potential difference between the tip 40 and the substrate 100 between voltages $V_1$ and $V_0$ via the voltage signal generator 250 of the controller 210. The voltage variations are synchronized to the periods of engagement and disengagement of the tips 40 with the surface of the polymer layer 90. Specifically, the period of contact of the tip 40 with the surface of the polymer layer 90 is timed to coincide with the application of a voltage pulse imposed between the tip 40 and the substrate 110 by the voltage signal generator 250. The voltage pulse produces an electric field E in the region of the tip 40. The electric field E is oriented to urge the tip 40 towards the surface of the polymer layer 90. The tip 40 thus applies an additional force to the surface of the polymer layer 90 under the influence of the electric field E. In a preferred modification of this embodiment of the present invention, the voltage pulses imposed between the substrate 100 and the tip 40 are coincident, during writing operations, with the writing pulses applied to tip 40 to enhance recording of data in the polymer layer 90. Likewise, in another preferred modification of the present invention, the voltage pulses imposed between the substrate 100 and the tip 40 are coincident, during reading operations, with the reading pulses applied to the tip 40 to enhance reading of data recorded in the polymer layer 90.

In the preferred embodiments of the present invention hereinbefore described with reference to FIG. 11D, variations in a potential difference are imposed between the tip 40 and the substrate 100 in correspondence with periodic engagement of the tips 40 with the polymer layer 90. However, it should be appreciated that, in some embodiments of the present invention, the periodic variation of the potential difference between the substrate 100 and the tip 40 may be employed independently of movement of the tip 40 relative to the polymer layer 90 in a direction normal to the polymer layer 90. Specifically, in such embodiments of the present invention, the voltage pulse imposed between substrate 100 and tip 40 remain synchronized to reading or writing pulses applied to the tip 40 as desired operation dictates. However, the tip 40 remains in constant contact with the surface of the polymer layer 90 as lateral movement of the tip 40 relative to the polymer layer 90 is produced via the transducers 160 and 170.

Referring back to FIG. 10, is particularly preferred embodiments of the present invention, the area of the substrate is divided into individually addressable conductive zones. The voltage signal generator 250 is selectively connectable to the zones via address lines formed in the substrate 100. This enables the controller 210 to establish, via the voltage generator 250 and the accompanying address lines, the electric field E between a selected zone and a selected tip 40 or group of tips 40. As mentioned earlier, the electric field E may be established between the substrate 100 and the heater element 30 of the tip 40. Alternatively, the electric field E may be established between the substrate 100 and a separate conductive platform integrated into the sensor 10 for generating the electric field E independently of the heater 30. Addressable conduction paths formed in or on the substrate 20 and each connecting to a different one of the conduction platforms may then be employed by the controller 210 to apply the electric field E to a selected tip 40 or group of tips 40. In other embodiments of the present invention, the electric field E may be replaced by a magnetic force field generated by selectively passing current through conductive coils formed in or on the substrate 20 and the sensor 10 respectively.

To summarize the various embodiments of the of the present invention presented herein, a method has now been described for writing data to and/or reading data from locations on a surface via a tip comprises moving the tip between the locations on the surface. At each location, the tip and the surface are moved towards each other. Energy and force are then applied to the surface via the tip. The tip and the surface are thereafter moved away from each other. In another arrangement described herein, a force field is imposed in the region of the tip to urge the tip towards the surface.

What is claimed is:

1. A method for writing data to and/or reading data from locations on a surface via a tip, the method comprising:

moving the tip alternately towards and away from the surface at the locations, wherein the tip is moved between the locations in an away position relative to the surface;

applying, at each location, a voltage pulse to the tip, wherein the voltage pulse is a voltage greater than a non-pulse voltage;

forcing the tip and the surface together, wherein the application of the voltage pulse to the tip is offset relative to the forcing of the tip and surface together, wherein the application of the voltage pulse to the tip is performed as the tip is moved towards the surface; and creating, by the voltage pulse, an electric field oriented to perform the forcing of the tip and the surface together.

2. A method for writing data to and/or reading data from locations on a surface via a tip, the method comprising:

moving the tip alternately towards and away from the surface at the locations, wherein the tip is moved between the locations in an away position relative to the surface;

applying, at each location, a voltage pulse to the tip, wherein the voltage pulse is a voltage greater than a non-pulse voltage;

forcing the tip and the surface together, wherein the application of the voltage pulse to the tip is offset relative to the forcing of the tip and surface together, wherein the application of the voltage pulse to the tip is performed coincidentally as the tip engages the surface; and creating, by the voltage pulse, an electric field oriented to perform the forcing of the tip and the surface together.

* * * * *